Nov. 13, 1962  J. W. COLSHER ET AL  3,063,412
BIRD RELEASE DEVICE
Filed Dec. 12, 1960
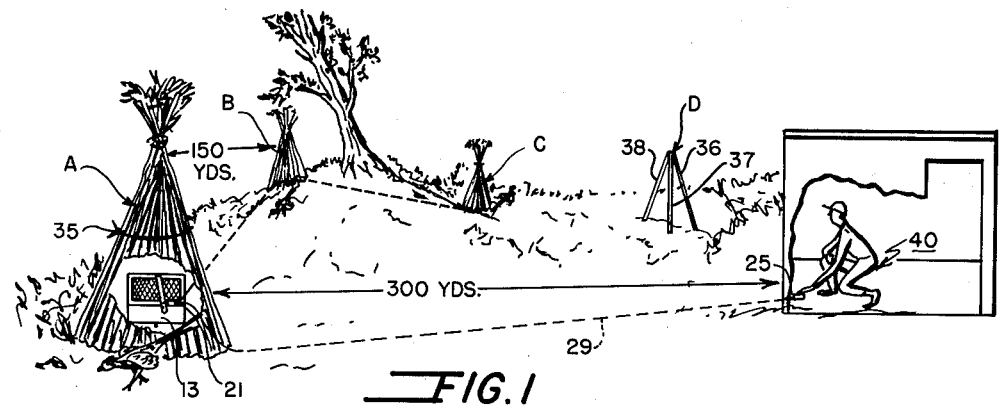
FIG. 1
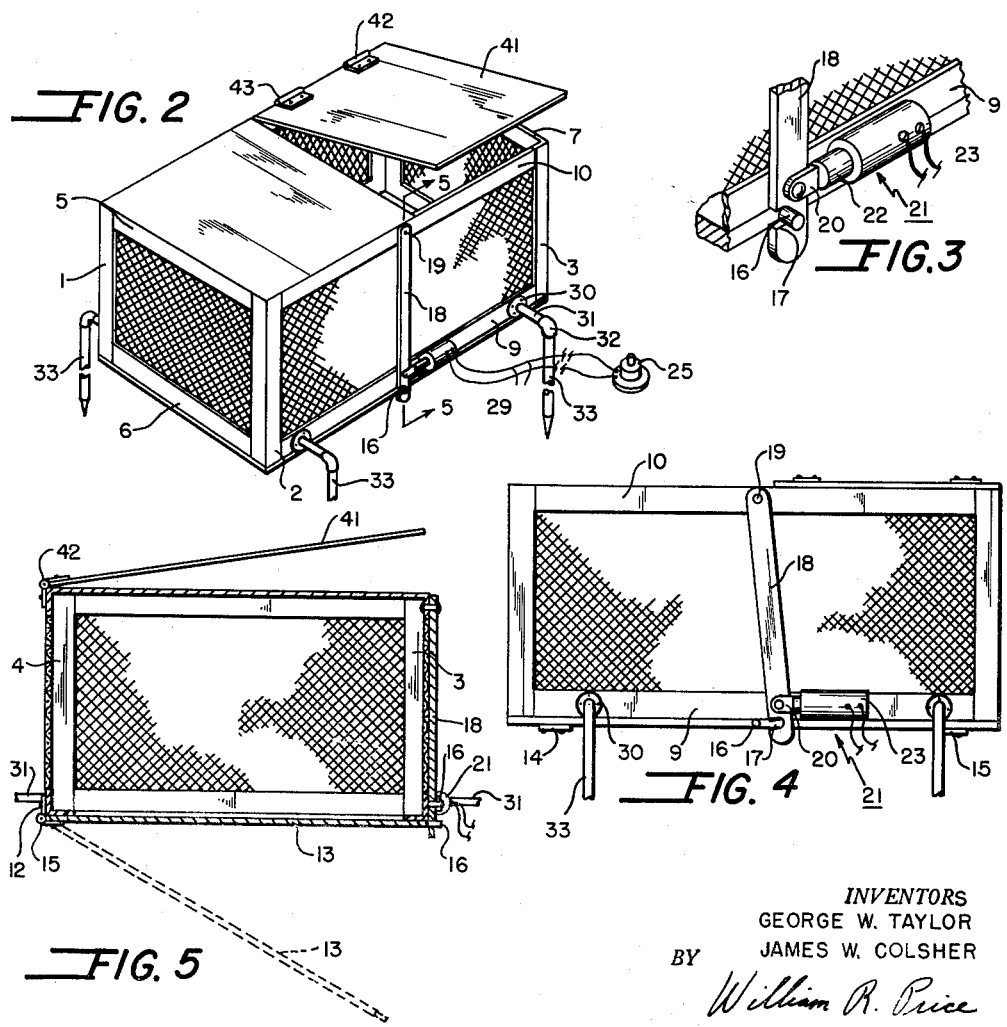
FIG. 2
FIG. 3
FIG. 4
FIG. 5
INVENTORS
GEORGE W. TAYLOR
JAMES W. COLSHER
BY William R. Price
ATTORNEY United States Patent Office 3,063,412
Patented Nov. 13, 1962

3,063,412
BIRD RELEASE DEVICE
James W. Colsher, 8003 Blue Bonnet Road, and George W. Taylor, 4604 Hillside Drive, both of Louisville, Ky.
Filed Dec. 12, 1960, Ser. No. 75,289
6 Claims. (Cl. 119—15.6)

This invention relates to a device for releasing game birds in hunting preserves. More specifically, this device relates to apparatus for releasing game birds of the ground nesting variety i.e. birds which customarily take cover on the land as opposed to game birds of the water variety.

The object of the artificial hunting preserve is to simulate natural hunting conditions for the sportsman who is by necessity earning a livelihood domiciled at a location far distant from natural hunting areas. Thus, in the large metropolitan areas, it is impossible for the hunting enthusiast to make weekend trips to the Dakotas or to Canada to hunt his favorite game. Thus, game preserves surrounding the large metropolitan areas have been established which provide areas containing trees and underbrush simulating that of a natural hunting area. These preserves which include the game birds of the ground nesting variety, such as pheasant, quail, grouse, etc., among their attractions, provide a place where the metropolitan business man can keep himself and his dog in trim. The problem for the proprietor is to be sure that within a relatively specified area, sufficient birds are available to justify the hunter's patronage. This is accomplished by simulating as near as possible the natural habitat of these birds by providing feeding areas for such birds in adjoining areas and by actually physically transporting such birds to such areas.

The latter method is inherently disadvantageous in that birds so transported to the area in question do not necessarily stay in the area and if placed in the area shortly before the arrival of the hunter and his dog are so dazed and dizzy from handling that they cannot be flushed. If the birds are transported there the evening before, quite often they will be into another area by the time the hunters arrive in the morning.

It is an object of this invention, therefore to provide a method and an apparatus for assuring a specified number of birds within a specified area at a particular time.

It is another object of this invention to provide a method and means for release of a given number of birds at a given time by the proprietor.

Another object of this invention is to provide a method for releasing game birds which minimizes handling of said birds.

Other objects of this invention will become apparent to those skilled in the art from the attached drawing and from the detailed description thereof which follows.

Referring now to the drawing, FIG. 1 illustrates the location of the apparatus of this invention installed in the corn shocks. FIG. 2 is an isometric view of the box. FIG. 3 is a fragmentary section illustrating the operation of the latching mechanism. FIG. 4 is a front elevation of the box. FIG. 5 is a sectional view taken along lines 5—5 of FIG. 2.

Referring now to the drawing in which like parts are designated by like numerals throughout, the box consists of a frame comprising four corner uprights, 1, 2, 3, 4; four end members, 5, 6, 7 and 8 and four longitudinal members, 9, 10, 11 and 12. The box may be covered with small mesh wire or hardware cloth. The bottom of said box is a hinged member, 13, suspended from said box by hinges 14 and 15. The hinged door member 13 is held in closed position by a lug 16 which fits into slot 17 of metal arm member 18 which is pivotably connected by bolt 19. Connected to the metal arm member by arm 20 is an electrically actuated solenoid 21 containing plunger 22 and housing 23. Lines 29 supply electrical current to the solenoid and the circuit is opened or closed by means of push button 25 held by the operator at the point 40. Current is transmitted by means of underground wire indicated by numerals 29. The top of the box contains hinges 42 and 43, connected to door 41 through which the birds may be deposited. The location of the boxes is best illustrated in FIG. 1 which denotes the boxes in corn shocks A, B, C. Underground wire 29 connected in parallel runs from the boxes to the pushbutton 25 in or adjacent to the office 40.

It is necessary to raise the box off of the ground in the shock to allow the door to open and to protect the birds. This is accomplished by a metal pipe assembly fitting on either end of the two lower longitudinal pieces 9 and 12. This assembly consists of pipe flange 30, nipple 31, elbow 32 and pipe 33. The flange 30, nipple 31 and elbow 32 provide a convenient handle for carrying the box. It also provides a convenient method of storage on two rows of parallel pipes. In addition, the elbow member 32 provides a surface by which the pipe 33 may be driven into the ground to support the box at any desired height. This provides a sturdy and stable support for the box.

As a matter of convenience we have found that a frame for the corn shock or other camouflage permits easier arrangement of passageways for the birds. This frame is illustrated in FIG. 1 by numerals 36, 37 and 38. The ease or difficulty with which a bird can move out of the shock is determined by the location and number of the passageways.

To facilitate getting in and out of the shock the frame indicated at D in FIG. 1 is about one half to three quarters of the height of a normal corn shock. Thus, the shock may comprise a top section and a bottom section. We sometimes tie the fodder around the frame at about the top of the bottom section with a string or light wire indicated by the numeral 35 in FIG. 1 at shock A. The top can then be easily removed so that the box may be placed inside or loaded with birds.

Operation

The evening prior to the arrival of the hunters, each of the boxes illustrated in FIG. 1 is loaded with one or more birds. By the following morning the birds are hungry and thus upon release will roam about in search for food. Having a full night's rest, the birds will be bright, dry and alert. Upon arrival of the hunters, the operator will push the button, thus energizing the solenoid to draw back the metal arm 18 and unlatch the bottom member 13 of each of the boxes. Gravity will allow the bottom member to open and thus drop the birds into the bottom portion of the corn shock.

We have found that the area in which the birds will spread and the rate of speed at which the birds will spread depends to some extent upon the height of the box from the ground and on the number of paths in the corn shock. Thus, it is possible to make allowances for the skill of the hunter. For example, if the hunter is an exceptionally good shot and has a good dog, accustomed to hunting wild game, the boxes are positioned at about 18 inches from the ground, with plenty of readily accessible passages for reaching the outside of the corn shock. This will allow a wide spread of the birds throughout the hunting area, at the greatest maximum speed and will most nearly simulate conditions in the natural hunting area. On the other hand, if the hunters are relatively new and it is necessary to keep the birds within a relatively small area, the passageway out will be more devious, thus slowing down the bird's egress from the shock and limiting its spread. The hunters are told that the best chance to locate the birds will be in a certain valley in which the corn shocks are located; the rest being up to them. By the time they have walked over a small knoll and come upon the corn shocks, the birds in question are busily hunting food and are well dispersed. Conditions are then perfect for good hunting corresponding to that of South Dakota.

It should be noted that by use of the apparatus of this invention that the rate of dispersal and the range of spread of the birds can be controlled by the operator by his method of placing the box in the camouflaged area. The birds are placed in cages and taken to the boxes on the evening prior to the hunt. Thus, handling is kept at a minimum. Accordingly, the birds are hungry, bright and alert when released by the operator who may be several hundred yards or more distant from the boxes in question. Since the boxes are camouflaged in the corn shocks, the wires are underground, the hunter has no way of knowing the location of the birds, so that the hunting is dependent on the skill of the dog and of the hunter.

We claim:

1. A game bird release device, adapted to release game birds of the ground nesting variety which comprises: a cage having a top member, a wall member and a bottom member, said bottom member being hingedly connected to said wall member and adapted to swing from a horizontally closed position, adjacent to said wall member, downwardly to a vertically open position, support members connected to said cage to support said cage above the ground at a distance sufficient to allow said bottom member to swing freely to said vertically open position, latch means attached to said wall member to engage with said bottom member and adapted for movement between an engage position and a release position, electromagnetic means operatively connected to said latch means and adapted to move said latch means to a release position and thereby allow said bottom member to swing downwardly to said vertically open position and control means, operatively connected to said electro-magnetic means, said control means, being located at a distance from said electro-magnetic means whereby birds may be released from said device by remote control.

2. A game bird release device, as defined in claim 1, in which the electro-magnetic means comprise a solenoid coil and plunger, said plunger being connected to said latch means and operative to move said latch means to release position when said solenoid coil is energized.

3. A game bird release device as defined in claim 1, in which the control means comprises a switch operatively connected to said electro-magnetic means by underground wire, whereby a series of said release devices may be electrically interconnected and operated by said switch.

4. A game bird release device as defined in claim 1, in which the latch means comprises a latch engagement member attached to said bottom member and a latch engaging member operatively connected to said electromagnetic means.

5. A game bird release device, as defined in claim 1, in which said top member of said cage contains a hinged door adapted to open for placing birds in said cage.

6. A game bird release device as defined in claim 1, in which said cage is rectangular in shape and in which said support members comprise four metal pipe assemblies, each pipe assembly comprising a flange, a nipple, an elbow and a pipe, said flange being attached to the lower portion of said wall member for attachment of said nipple and elbow thereto, so as to extend laterally from said wall with the elbow turned downwardly for vertical attachment of said pipe member thereto, whereby said pipe assemblies extend laterally from said cage so as not to interfere with the downward swing of said bottom member.

References Cited in the file of this patent

UNITED STATES PATENTS

| | | |
|---|---|---|
| 693,901 | Portman | Feb. 25, 1902 |
| 2,733,427 | Chandler | Jan. 31, 1956 |